[72] Inventors Joseph E. Bluth
North Hollywood;
Leo C. Hanseman, Burbank, both of Calif.
[21] Appl. No. 825,291
[22] Filed May 16, 1969
[45] Patented Nov. 2, 1971
[73] Assignee Technicolor, Inc.
Hollywood, Calif.

[54] HIGH-DEFINITION COLOR PICTURE EDITING AND RECORDING SYSTEM
18 Claims, 4 Drawing Figs.

[52] U.S. Cl. .................. 178/6.6 A, 178/5.4 CD, 179/100.2 B
[51] Int. Cl. .................. G11c 27/02, H04n 5/78, H04n 9/12
[50] Field of Search .................. 178/6.6 A, 6.7 A, 5.4 CD; 179/100.2 B

[56] References Cited
UNITED STATES PATENTS

| | | | |
|---|---|---|---|
| 2,816,157 | 12/1957 | Andreas et al. | 178/6.7 |
| 3,051,777 | 8/1962 | Lemelson | 178/6.6 |
| 3,123,668 | 3/1964 | Silva | 178/6.8 |
| 3,176,067 | 3/1965 | Machein et al. | 179/100.2 |
| 3,180,930 | 4/1965 | Bounsall | 179/100.2 |
| 3,255,303 | 6/1966 | Kihara | 178/6.6 |
| 3,272,918 | 9/1966 | Koll et al. | 178/6.6 |
| 3,342,932 | 9/1967 | Bounsall | 179/100.2 |
| 3,463,877 | 8/1969 | Crum | 179/100.2 |

*Primary Examiner*—Terrell W. Fears
*Assistant Examiner*—Steven B. Pokotilow
*Attorney*—Lyon & Lyon

ABSTRACT: There is disclosed herein an electronic system for the production of high-definition color motion pictures for theatrical and television use. The system employs digital video techniques wherein electronic analog video color signals are digitized, and the digital signals are stored. A scene may be played back immediately during shooting for monitoring purposes or recorded subsequently on film for facilitating editing. Desired portions, such as frames or scenes, of the stored digital color picture information may be selected and assembled, and operated upon to provide special effects, to achieve suitable editing, the resulting pictures again being recorded digitally. This resulting recording may be reproduced and electronically color corrected and enhanced and then converted back to analog form for ultimate visual presentation. The analog signals may be used to generate a color film, or the digital signals before conversion may be converted to different scan standards for presentation according to various television scan standards.

INVENTORS
JOSEPH E. BLUTH
LEO C. HANSEMAN

BY Lyon & Lyon

ATTORNEYS

INVENTORS.
JOSEPH E. BLUTH
LEO C. HANSEMAN
BY Lyon & Lyon
ATTORNEYS

HIGH-DEFINITION COLOR PICTURE EDITING AND RECORDING SYSTEM

BRIEF SUMMARY OF THE INVENTION

This invention relates to an electronic system for achieving high-definition color motion pictures for theatrical and television use, and more particularly to a system of this nature employing digital video techniques.

BACKGROUND

Present-day color television techniques utilizing electronic cameras, magnetic tape analog video recording, and sophisticated special effects, editing and post-production devices have demonstrated the efficiency and relative economy of the NTSC and PAL systems in the production of highly intricate television programs, with picture quality adequate for home viewing.

Recent advances in technology have resulted in the development of systems which enable the transfer of NTSC and PAL color television video signals, stored on magnetic tape, to color motion picture film. However, the quality of the image on the motion picture film so obtained is restricted by the limitations of the NTSC and PAL color television systems. The picture resolution capabilities of NTSC and PAL color television, though acceptable for home television viewing, are inadequate for high quality motion picture applications.

Color television cameras and systems developed for commercial broadcast applications represent fundamental design compromises dictated by industry demands and the laws of economics and, in many instances, by the peculiarities and limitations of NTSC and PAL systems, both of which have been engineered to function within the boundaries of monochrome television standards formulated 25 years ago.

On the other hand, the system of the present invention is not tied to the restrictions imposed by current and prior systems, but it is related to the standards of other systems because of design and scan standards incorporated into the present system, and can therefore function under various standards through conversion techniques disclosed herein, such as function as an integral part of an NTSC or PAL system. Thus, new line and field rate scan standards are utilized in the present system resulting in a practical high-definition electronic system for the production of color motion pictures, while at the same time fulfilling the requirements thereof and being compatible with conventional television system standards through conversion capabilities of the present system.

Accordingly, the present system is universal in nature, usable throughout the world for high quality motion picture or television production. It facilitates the application of highly efficient and economical television production techniques to the art of making motion pictures. The system allows a producer to shoot television type shows with presently used and proven television techniques, but it also allows a producer to shoot motion pictures or films for television or other uses with either the same television techniques, with motion picture techniques, or with a combination of the two. By using some of the advantages of television techniques applied to motion picture shooting, it is possible to save much time and expense in the shooting process because a director can see exactly what he is shooting as he shoots it. He is able to play back a scene immediately after it is shot and check it out. He is able to test and preset certain effects because of the immediate replay capabilities Shoot television-type shows with presently used and proven television techniques, but it also allows a producer to shoot the system without having to go through conventional processing before viewing the end result. It is believed that through the flexibility of the system of the present invention the same will allow producers, directors and other creative people to set up and establish new techniques of photography and production not heretofore possible.

Consequently, it is a principal object of the present invention to provide an improved system and method of producing color motion pictures.

It is another object of this invention to provide an electronic system for enabling high-definition color motion pictures to be produced.

A further object of this invention is to provide a new color motion picture system employing digital video techniques.

An additional object of this invention is to provide a high-resolution color motion picture system having conversion capabilities such that the same is compatible with the operating standards of various television systems.

Another object of this invention is to provide a system which allows ready aspect ratio and scan rate conversion.

A further object of this invention is to enable improvement in color motion picture production.

BRIEF DESCRIPTION OF THE DRAWINGS

These and other objects and features of the present invention will become better understood through a consideration of the following description taken in conjunction with the drawings in which.

DETAILED DESCRIPTION

INTRODUCTION

Briefly, in accordance with the concepts of the present invention, an electronic system for the production of high-definition color motion pictures for theatrical and television use is provided employing digital video techniques. A three-sensor color camera is employed for providing simultaneous red, blue and green analog video output signals. A scan standard of approximately 1575 lines at 24 frames per second is used. Each of these signals is sampled to provide three multibit digital codes corresponding to the three color signals. Preferably, three sampling points on each analog signal are employed and converted to 8-bit digital information. This digital information, along with digital frame addresses for each frame of the picture, and timing signals, are recorded on magnetic tape by a digital recorder. The digital signals may be simultaneously reconverted to analog form and applied to a color monitor for allowing monitoring of the motion picture as the same is being taken. The recorded signals may be played back and recorded to provide a film for editing purposes. Generally, it is only necessary to convert one of the color signals back to analog form and then record this video signal on film for editing purposes.

Master tapes which may be copies of the entire tape recorded by the digital recorder, or portions thereof, are placed on one or more incremental recorders which in turn allow any number of frames or scenes of the recorded motion picture to be selected at will. This is done to enable various frames and scenes, as well as special effects, to be assembled into a final master color motion picture. An assembler system is associated with the incremental recorder or recorders for selecting those frames and/or scenes for compilation into the final master motion picture. The assembler is controlled by punched paper tape which is recorded by the film editor so as to select the desired frames and scenes, the order thereof, and the desired special effects.

A special effects generator also is provided and employed in conjunction with the assembler. Typically, the special effects are separately recorded, placed on one or more incremental recorders, and then selected as desired for integration into the final motion picture.

During the assembly process, the final motion picture is recorded on a master digital recorder for subsequent use.

Upon playback of the master digital recorder, color correction as well as image enhancement may be performed electronically to improve the quality of the final motion picture. The final motion picture, still in digital form, then may be converted back to analog form and recorded on color film, or applied through a recirculating loop memory system for conversion to other television scan standards, such as 525 lines 30 frames per second NTSC standards and 525 lines 25 frames per second PAL standards.

THE SYSTEM

Figure 1:
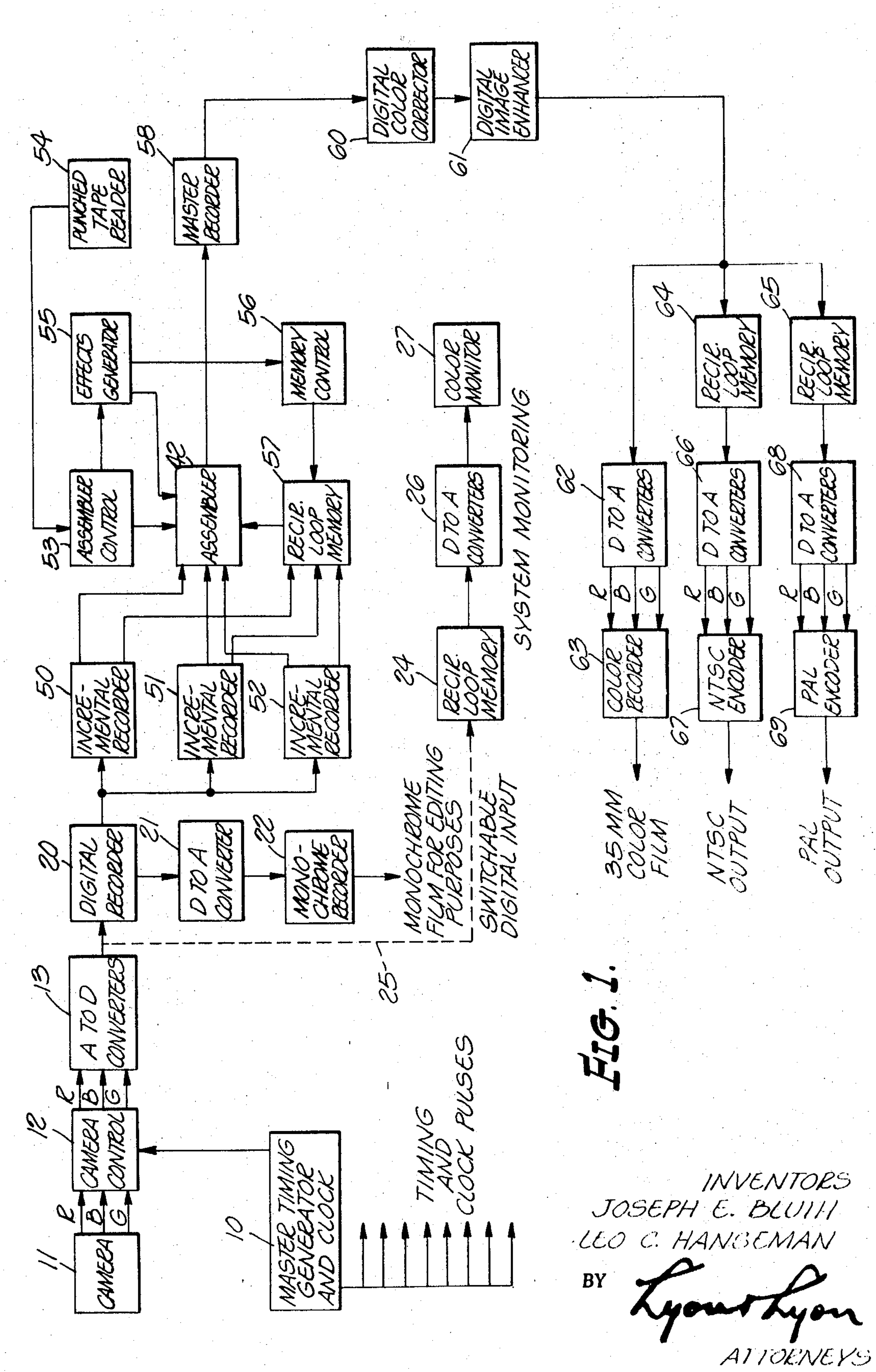
FIG. 1 is a diagram of a system according to the concepts of the present invention.

Turning now to the drawings, FIG. 1 illustrates a circuit diagram of an electronic system for providing high-definition color motion pictures for theatrical and television use according to the concepts of the present invention. The system basically includes a color camera for generating red, blue and green analog color signals, an analog-to-digital conversion subsystem for digitizing these analog signals and for recording the digital signals, an assembler and special effects subsystem for compiling scenes in a desired form with or without special effects, and a readout subsystem whereby the signals are converted to analog form for generating a color film or converted to any one of several television scan standards and then converted to analog form for television use.

It first should be noted that complete synchronization of the entire system is provided from a master timing generator and clock 10 which provides driving pulses for all components of the system, and master clock signals for use in recording and playback and in recirculating loop memory devices which will be described subsequently. A high-definition electronic camera 11 is provided which operates at a scan standard of approximately 1575 lines per frame, 24 frames per second, noninterlaced. This camera provides either motion picture wide screen 2.35:1 or television 1.33:1 aspect ratios. This, of course, is a color camera employing color sensors and circuits to produce red, blue and green analog video outputs, with video bandwidths being approximately 15 megaHertz per color channel although higher or lower bandwidths may be used consistent with resolution and definition requirements. Thus, for example, subsequent refinements in sensors and other basic components may be incorporated as desired to improve the performance of the camera while still maintaining compatibility with the remainder of the system. Inasmuch as the line- and field-scanning rates are set as noted above, bandwidth increases will result in improvements in horizontal resolution.

CAMERA

The camera 11 includes an optical system which utilizes either fixed focal length optics of high definition and high image brilliance, or variable focal length (zoom) lenses. The polychromatic light passing through the taking lens is optically separated into red, blue and green components complementary to the requirements of color motion picture film. Three sensors, one for each color, are used for the optical-to-electrical image conversion. Horizontal and vertical deflection of the scanning electron beam within the sensors is employed to provide the approximately 1575 lines per frame, 24 frames per second standard noted above. Electrical registration of the three colored images is used, and the electrical scanning sizes are adjustable to provide either 1.33: 1 or 2.35: 1 picture aspect ratios. Additionally, a high-definition electronic kinescope-type viewing system is provided to facilitate composition and the optimization of optical focus by the camera operator.

The three color signals, red, blue and green from the camera 11 are applied to a camera control 12. The camera control includes the electrical adjustments required to optimize the performance of the camera for high-definition operation, and provides simultaneous high-definition red, blue and green outputs with video bandwidths of approximately 15 megaHertz per color channel, or above. At this point, if desired, an electronic switching system (not shown) can be inserted to permit, for editing purposes, the selection of any one of several high-definition camera outputs for routing to a recording device and for allowing the insertion into the program of special effects such as dissolves, fades, and so forth.

VIDEO SIGNAL CONVERSION

The red, blue and green analog video outputs from the camera control 12 (or from the electronic switching system noted above, if used) are converted to digital form by analog-to-digital converters 13, one converter being used for each color.

Figures 2, 4:
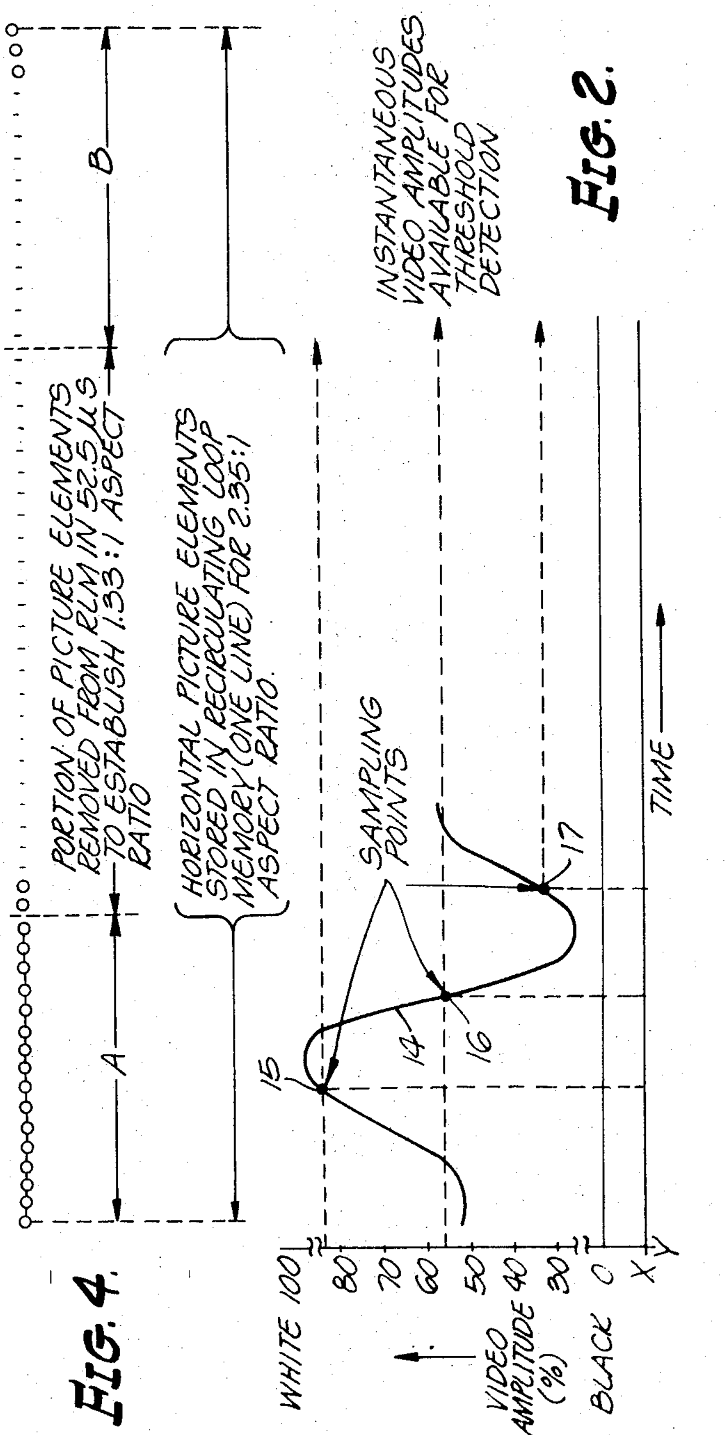
FIG. 2 is a waveform diagram illustrating sampling of analog video signals.
FIG. 4 is a diagram illustrating picture aspect ratio conversion.

Each of the three incoming analog video color signals thus is sampled by a respective one of three analog-to-digital converters. The sampling of each signal occurs at a rate which is three times the highest video frequency involved in the manner illustrated in FIG. 2. Figure 2 illustrates an exemplary analog video color signal waveform 14 and three sampling points 15 through 17. It has been determined that three sampling points at the highest video frequencies involved are adequate to assure relatively faithful and accurate reproduction of the high video frequencies, and extremely faithful reproduction of all lower frequency video components. The use of individual color channel bandwidths of approximately 15 megaHertz therefore results in a sampling rate of approximately 45 megaHertz. Sampling rate pulses of approximately 45 megaHertz required to synchronize the analog-to-digital converters with other components of the system are obtained from the master timing generator 10.

The X-axis as seen in FIG. 2 is time and the Y-axis is percent video amplitude. The waveform is expanded to show one cycle at the highest video frequency involved. The sampled points 14 through 17, representing discrete instantaneous video amplitudes for each color signal, are fed into a respective threshold detector in the A-to-D converters 13 (one threshold detector is used for each color channel) which transforms each sampled amplitude into 8-bit digital information. That is, selected levels of the analog waveform for each color are sampled to provide an 8-bit digital code output representative of the analog signal. The use of 8 bits results in a range of 256 to 1 for video amplitudes from black to white. Thus, the A-to-D converters 13 have an output of three 8-bit digital codes which respectively represent the red, blue and green video signals.

DIGITAL SIGNAL STORAGE

The output digital signals from the converters 13 are applied to a digital recorder 20 where each respective color signal is separately and simultaneously recorded longitudinally on magnetic tape. Thus, the 8-bit digital information associated with each color is simultaneously recorded by eight heads with one head assigned to each bit, arranged in stacks, with three such stacks consisting of eight heads each required for a simultaneous red, blue and green recording. The recording frequency simultaneous 45 megaHertz which is equivalent to the sampling rate of the highest video frequency. Clock signals, generated by the master timing generator 10 are recorded simultaneously, through the use of an additional recording head, to provide upon playback a recorded timing signal that can be compared to the master clock signal for ensuring proper synchronization and to eliminate any time base errors. Furthermore, additional recording heads are provided to enable simultaneous recording of frame address data for each picture frame, and this address data is employed to permit positive identification and selection of each recorded picture frame. The frame address may be derived directly from the clock 10.

The pictures recorded in digital form by the digital recorder 20 can be transferred to black and white 35 mm. or 16 mm. motion picture film to provide a work print for editing purposes by playing back the tape through a digital-to-analog converter 21, and using the resultant analog video signals to drive a laser beam recorder 22. Only one color (usually green) need be converted to analog video for this purpose, and thus only one digital-to-analog converter 21 is required. Also, the frame identification data is recovered from the tape and used to provide edge numbers on the film during the recording process by the recorder 22.

If desired, video tape television programs may be edited on an ½-inch, one-inch ¼-inch lesser size tape, and then these cuts may be converted back to a 2-inch master tape. Alternatively, the picture information may be converted to one-inch, one-half-inch, or one-fourth-inch video tape with the same frame address edge-numbering cut such that if it becomes desirable to use one-inch video tape as an editing device for the editor this can be readily accomplished.

Additionally, the pictures may be immediately monitored as they are taken. For this purpose, a recirculating loop memory 24 including three separate but simultaneously and synchronously operating memories (one for each color) is provided, and may be coupled with the converters 13 as indicated by a dashed line 25 to provide signals to D-to-A converters 26 to provide red, blue and green analog video signals for a color monitor 27. The signals from the memory 24 may be converted, as will be described subsequently, to provide 525-line, 30-frame interlaced (or 625-line, 25-frame interlaced) red, blue and green analog video signals for the monitor 27.

RECIRCULATING LOOP MEMORY

Turning for the moment to the recirculating loop memory 24, and the other recirculating loop memories used in the system which are discussed subsequently, the same is a device which line-sequentially stores one complete frame of video data in digital form, with readout available either line-sequentially or on a selected line access basis. The memory includes many discrete bistable storage elements arranged as a loop to store one complete line of video data, and a number of loops are interconnected to form the overall memory to enable storage of one complete frame of video data. In the case of a high-definition system employing 1575 lines, 1575 loops are used. The number of storage elements per loop depends upon the desired resolution and bandwidth capabilities. At least 700 elements per loop are desired.

Figure 3:
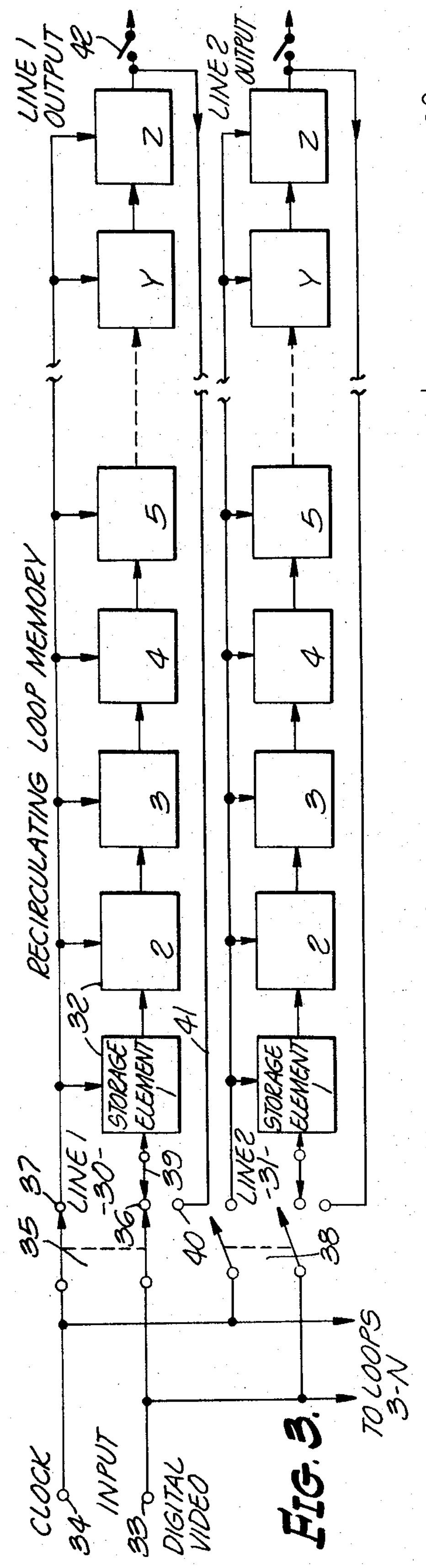
FIG. 3 is a diagram of a recirculating loop memory employed in the system of FIG. 1.

Two loops 30 and 31, representing the storage for two horizontal lines, are illustrated in FIG. 3. Each of these loops is identical and includes a plurality of bistable storage elements 32. Each storage element serves to store one horizontal picture element, and each loop stores all of the horizontal picture elements for one line. Digital video is applied at an input 33, and clock signals from the clock 10 are applied at an input 34. These signals are applied through a switch 35 to a video input terminal 36 and clock input terminal 37, respectively, of the loop 30. A similar switch 38 is provided for the loop 31, the switches 35 and 38 enabling the video and clock signals to be successively applied to first one loop and then the next loop, and so on down all loops until a complete frame of video information has been stored in the loops. The loop 30 also includes a selector switch 39 which may be selectively coupled to the input terminal 36 or to a terminal 40 on the recirculating feedback loop 41. Thus, the switch 39 allows digital video to be applied from terminal 36 to the first storage element 32, or allows recirculation of digital video from the last storage element through the line 41 and terminal 40 back to the first storage element 32.

Digital information corresponding to the first horizontal picture element of line 1 of the picture is fed into the first storage element 32 of line 30, and this picture element is stored therein. A clock pulse is applied to the storage elements of the loop 30 and causes the first element 32 to release its stored digital video information and transfer the same to the second storage element 32. The first clock pulse is followed by the arrival in time at the first storage element 32 of the digitized second horizontal picture element, which is then stored in the first storage element 32. The second clock pulse is applied to the storage elements 32, stored data from the second element being transferred to the third element, and stored data from the first element being transferred to the second element. Thus, digital video is fed into one end of the loop 30 and is caused to move along the chain of storage elements 32 under control of the clock pulses, each clock pulse causing data to be advanced to the next storage element. This process continues until all data associated with one line of the picture is stored.

Data associated with the second scan line of the picture, together with clock pulses, is routed to the second loop 31 by the switch 38 after the first scan line of the picture has been stored in the looped 30. Each successive scan line of the picture is similarly routed to its corresponding loop or line storage chain, the process continuing until all data associated with one picture frame is stored. It will be appreciated that although only two loops 30 and 31 are shown in FIG. 3, the total number of such loops corresponds with the number of scan lines involved, such as 1575

At the completion of each loop storage cycle, the output of the loop may be switched to the input, as by the switch 39 as noted above. The clock pulses are continually applied to the line to cause the stored data to continue to circulate within the loop from output to input. The circulating stored data may be extracted and utilized in several ways. It may be used in conjunction with an assembler 42, which will be described subsequently, for still frame and special effects. Additionally, the stored data may be extracted from the memory either line-sequentially or on a selected line access basis, at variable line readout rates, by supplying appropriate clock pulses to the memory, each clock pulse causing data to advance one step through the chain. It will be apparent to those skilled in the art that the rate of advance, and therefore the readout speed, is determined by the frequency of the clock pulses employed. Hence, conversion from the high-definition scan standards to either 525-line, 30-frame interlaced, or 625-line, 25-frame interlaced, may be accomplished by utilizing the selected line access readout capability of the memory as will be described subsequently in greater detail. Briefly, for example, two recirculating loop memories as illustrated in FIG. 3 and described above may be employed to alternately store frames (frames 1, 2, 3, etc.) under the 1575-line/24-frame high-definition standard, with readout being from a selected one-third of the individual loops of each memory for conversion to 525line /30frames per second. This is accomplished by reading out from every third loop of the memories at a changed clock rate for the storage elements and gating rate for output switches 42 during readout as compared to the clock and input switch gating rate used for storage.

ASPECT RATIO CHANGE

In a similar manner, the selected line access readout capabilities of the memories may be employed for changing the output picture aspect ratio as generally illustrated in FIG. 4. By use of the recirculating loop memory, conversion from 1575 lines/24 frames per second 2.35:1 motion picture wide screen aspect ratio to 525 lines/30 frames per second 1.33:1 television aspect ratio may be accomplished. All of the horizontal picture elements stored in the memory for each line are read out where a 2.35:1 aspect ratio is desired whereas a portion of the horizontal picture elements are discarded as indicated at A and B in FIG. 4 to achieve a 1.33: 1 aspect ratio. In order to conform to the standards of a 525-line system, by the selection of the appropriate readout clock signal frequency only the digitally stored horizontal picture elements intermediate portions A and B are recovered in 52.5 microseconds to provide the 1.33:1 television aspect ratio, while the portions A and B are discarded within 11 microseconds, the latter period being equivalent to the horizontal blanking time under NTSC color television standards.

SCENE COMPILATION AND SPECIAL EFFECTS

Turning again to the overall system and usage thereof, under normal operation and editor will use the film work copy, mentioned earlier, or a one-inch or lesser gage video tape, to perform the editorial cuts in the movie or program. Using the film, he will actually make all cuts exactly as he desires of the various scenes and sequences to be assembled together. Since this material is edge-marked with frame addresses, there is then available an exact record of what scenes are to be joined together and at what specific frame point this shall occur. With this capability, it is readily simple for the editor to indicate the location of dissolves, fades or special effects by a work sheet suitably identifying the appropriate frame addresses.

The recorded information from the digital recorder 20 may be operated upon, modified and assembled as briefly noted above by means of a subsystem including three incremental recorders 50 through 52, the assembler 42, an assembler control 53, punched-tape reader 54, special effects generator 55, memory control 56, and a recirculating loop memory 57 similar to the memory 24 described above. The incremental recorders 50 through 52 are of the type used to record and play back computer data. Information concerning the makeup or compilation of the motion picture as decided upon by the editor according to his asthetic taste is stored on paper tape which in turn can be played back by the punched-tape reader 54. The information from the punched tape allows the assembler 42 to search out the various picture frames according to address from the incremental recorders, select the desired sequences and record the resulting data on a master recorder 58. Special effects such as slow motion, stop motion, speed-up, dissolves, fades and matting may be achieved through the use of the effects generator 55, memory control 56, and recirculating loop memory 57. As with the memory 24, the recirculating loop memory 57 stores a full frame of high-definition information, although, if desired, several of these memories may be utilized in tandem so that more than one frame can be acted upon at one time. When one frame is held and recirculated over and over again, it is possible to change the form of the frame in any desired way one frame at a time. It may be slowed down, speeded up, or lines can be removed at will.

Considering this portion of the system in more detail, the cuts desired by the editor of the various scenes and sequences to be put together are identified and stored on punched tape. Punched tape is than employed to automatically control, through the assembler control 53 and assembler 42, the order of assembly of program material previously recorded in digital form. The frame identification data enables playback of desired frames and scenes by the incremental recorders 50 through 52 in proper sequence and time as determined by the assembler 42. It will be apparent that this then is a sequential assembly subsystem which searches for the particular desired scene or frame existing in one of the three incremental recorders and, in turn, extracts that scene or frame and records the same on the master digital recorder 58.

Although three incremental recorders 50 through 52 are illustrated, any number as desired may be employed depending upon how many sequences there may be, or the various combinations and permutations of portions of sequences, to be assembled. The assembler then controls the operation of each incremental recorder, and selects the various program scenes and frames as needed for the final assembled motion picture.

In most cases, those scenes requiring special effects such as fades, dissolves, mattes, and so forth are assembled first and separate from the final picture assembly operation. The resulting completed effect is then returned to one of the incremental recorders 50 through 52, and set up for the final assembly as the rest of the scenes are assembled according to the foregoing description. This approach is in accordance with the present-day manual system of film editing in which an editor edits a work print which in turn serves as a guide for final negative editing. The editor also decides where dissolves, fades, and other effects are to occur. Then by procuring dupe negatives of the material involved in the dissolve, or other effect, the effect is built up or created using an optical printer and special laboratory processing techniques after going through several duping processes. Depending upon the effect, a new master negative is derived which, in turn, is cut back into the original negative but now contains the desired effect. Inasmuch as this is the standard approach to film editing, the present system follows the same approach in order to be compatible there with, but all the effects and assembly are done automatically and electronically by the system once the sequences of assembly and effects desired are decided upon by the editor.

As noted earlier, an effects generator 55 is used to provide special effects. This is used in conjunction with the recirculating loop memory 57. The effects generator 55 provides television fades, mattes, split scenes, wipes. and other effects. The recirculating loop memory 57, like the memory 24, is a one-frame storage device to provide still frame, slow motion, and fast motion effects. As an example, in order to provide a fade, the effects generator 55 produces a fading action of the digital video signal from an incremental recorder by substituting a new digital code therefor. As previously described in conjunction with FIG. 2, each color signal is represented by 8-bit codes. The changed code is inserted into the digital video signal so that this signal is acted upon at the proper time, e.g., incrementally varied to provide fade. For example, at the point where the fade is to commence, the digital code may indicate a 20 percent white level. This code is sensed, and a new 8-bit code is substituted. The new code is varied incrementally over a predetermined time period to complete the fade.

A dissolve is similar to a fade but involves a double action. The output of two incremental recorders is employed, and the digital coding of the signal is changed at a prescribed point such that one signal decreases in video amplitude at the same time that the second signal increases in video amplitude. This is also accomplished by varying the respective digital codes. A cross fade at the point desired occurs, resulting in a dissolve. In present-day television analog systems this is accomplished by changing the bias on amplifiers to directly affect the amplitude of a signal or signals. With the present system, a similar result is achieved by varying digital coding.

In performing a matte, a portion of one picture, which may be desired to appear as a foreground element, is made to appear in whole in a second picture which becomes the background portion, the composite of the two forming a complete and satisfactory picture image. In this case, the foreground image can be photographed in front of a black screen, or a red, green or blue screen, or depending upon the gray scale content of the foreground image, in front of a white screen. A decided difference in either contrast ratio or color then results between each edge transition dividing the to-be matte foreground portion and the background information (black, color or white screen) which is to be discarded from the picture. Since the background is known and the digital codes therefor can be readily detected, all that is required is to make a digital comparison between desired pictorial content and background in order to discard the background information.

In a similar manner as will be apparent, a transition difference between foreground (to be discarded) and background (to be used) can be easily sensed as an amplitude difference in digital form, and an electronic cutout or deletion of the foreground information is accomplished by making the cutout points to exist at a transition wherever the nearest sampling signal (in digital form) has occurred. This is the sampling signal involved in the conversion of the signal originally from analog to digital form. This electronic cutout thus serves to cut the hole in the background picture which then later has the foreground element or elements combined into it. By using the sampling pulses to form the cutting edge pattern, the resolution and sharpness of the cut is very good because they are at a sample frequency of 45 megacycles as described above in connection with a discussion of FIG. 2. On any given scanning line a cut starts at the transition point of black to white or white to black and stays in this position until it is released at the next transition, depending upon foreground and background picture information.

The foregoing procedure for performing mattes compares to a similar procedure in the film laboratory in that dupe negatives, interpositives, and matte cutouts are made to function in a similar manner to perform a matte. However, the present system performs the matte instantly and electronically. In present-day television systems, analog effects generators are employed, but the analog system suffers greatly in that there must be a greater separation between foreground and background images since the matting action is performed by a clipper and the edges between the two are never clean. On the other hand, the present system will produce sharp, clean matting edges.

In order to perform a split scene or a wipe, a portion of one picture is made to be inserted into another picture either by a fixed pattern or by a moving pattern. Pulses are derived from the horizontal and the vertical scanning system and used to generate a series of electronic patterns in a known way. The edges of these patterns are, in turn, used as the demarcation point between one picture and another. The transition change point is made to occur similar to the matte transition in that it is done at the sampling points as they occur in the picture.

In order to perform still frame, slow motion, and speed-up motion, the recirculating loop memory 57 is employed. The video digital information is fed into the memory frame by frame and is clocked and read out such that one frame can be held continuously and read out continuously. Also, clocking the memory slower or faster, and thus reading the video information out of the memory slower or faster than it was stored, allows the proper slow or fast motion effect to be achieved.

As noted earlier, the special effects are done separately from the final assembly. The finished effect, together with its frame identification data, is placed on one of the incremental recorders and then is available to be edited into the rest of the picture information and finally recorded on the master digital recorder 58 in the final motion picture form.

IMAGE CORRECTION AND ENHANCEMENT

Turning now to the remainder of the system shown in FIG. 1, the finally edited pictorial program, now stored on magnetic tape in digital form, may be played back on the master recorder 58 and transferred to motion picture film and/or converted for use according to one or more of several television standards. During playback of the master tape by the recorder 58, the digital video signals are routed through a digital color corrector 60 and digital image enhancer 61. The color corrector 60 establishes predetermined sampling points as desired which are equivalent to perfect flesh tones to thereby change the digital video signals to color correct each scene on a scene-to-scene basis. The output of the color corrector is then applied to the image enhancer 61 which, by controlling sampling points of picture edge transitions, thereby eliminates smear, ringing and overshoots, and increases the rise time or sharpness of the edge transitions, and increases the modulation depth of fine image detail. The output of the enhancer 61 is high-definition color-corrected and image-enhanced red, blue and green video signals in digital form.

READOUT AND SCAN STANDARDS CONVERSION

These digital signals may then be applied through digital-to-analog converters 62 which convert the digital video color signals back to an analog form. The analog signals, which are simultaneous red, blue and green analog video signals, then may be applied to a color recorder 63, such as a laser beam recorder, for recording 35 mm. color film. The recorder 62 includes suitable laser beam sources of red, blue and green light consistent with the spectral sensitivity characteristics of the color negative motion picture film used. The recorder also includes means for modulating the intensity of the beams in response to the analog video amplitude variations, and scan means for causing simultaneous and in-register red, blue and green horizontal scan motion at a predetermined optical point for motion picture film moving through a film transport mechanism at a constant velocity equivalent to 24 frames per second. The noninterlaced scan characteristics of the present high-definition system eliminate the need for both vertical deflection of the recorder beam and conventional intermittent-type film advance in the film transport mechanism.

Similarly, the output from the enhancer 61 may be applied to either or both recirculating memories 64 and 65 for ultimate conversion of the color digital signals to analog form according to NTSC or PAL standards. The particular manner of conversion is discussed subsequently in connection with Tables 1and 2.

The memory 64 serves to convert the 1575 lines/24 frames per second digital video information from the enhancer 61 to 525 lines/30 per second, interlaced digital video according to the scan standards of the NTSC system. Similarly, the memory 65 converts the 1575 lines/24 frames per second video signals to 625 lines/25 per second, interlaced, video according to PAL standards.

The 525 lines/30 frames per second digital video from the memory 64 is applied through the converters 66, like converters 62, which in turn provide simultaneous red, blue and green analog video to the NTSC encoder 67. The output of the encoder is a standard NTSC video signal and is available for transmission, or for recording in analog form on magnetic tape. The 625 lines/25 frames per second digital video information from the memory 65 is handled in a similar manner.

The following tables 1*a* and 1*b* illustrate in diagrammatic from the manner in which high-definition 1575 lines/24 frames per second digital video information is converted to 525 lines/30 frames per second digital video information. As will be readily apparent, certain of the lines of the high-definition video information are used and certain are discarded. The recirculating loop memory system 64 actually includes a pair of recirculating loop memories as illustrated in FIG. 3, each including approximately 1575 individual recirculating loops of storage elements for storing the high-definition lines of video information. Through the use of two recirculating loop memories, two frames of 1575-line video information can be stored, with selected lines being read out to provide the 525 lines/30 frames per second video information. As will be noted from Table 1, an additional line (1576) may be used to provide the last half line (263) required for a 525-line interlaced system.

The first memory (RLM1) in the memory system 64 stores odd number high-definition frames, and the second (RLM2) stores even number high-definition frames. Readout from the first memory begins after completion of full storage therein and at the beginning of storage of information in the second memory. During readout from the first memory, storage in the second memory occurs. At the conclusion of readout from the first memory, readout from the second memory begins.

As will be apparent from Tables 1*a* and 1*b*, two frames of high-definition lines are stored in 1/12th second, and five fields of 525 lines are read out in 1/12th second. Readout to provide the 525 lines/30 frames per second conversion occurs as follows according to Tables 1*a* and 1*b*: (1) field 1 of frame 1 is derived from lines 1, 7, 13, 19, etc. (these lines correspond to respective loops in the first memory); (2) field 2 of frame 1 then follows by readout from lines 4, 10, 16, 22, etc. of the first memory; (3) field 1 of frame 2 is read from lines 1, 7, 13, 19, etc. of the second memory (RLM2); (4) field 2 of frame 2 definition then is read from lines 4, 10, 16, 22, etc., of the second memory; and (5) finally, field 1 of frame 3 is read from lines 1, 7, 13, 19, etc., of the second memory. It will be noted that the first field 1 of the frame 3 contains the same information as the field 1 of the frame 2, but because of the high definition of the original information and the rates of operation, any degradation in definition as compared to conventional NTSC television reproduction is essentially unperceptible. This process is repeated to read out the next five fields, which begins with field 2 of frame 3 which is obtained from lines 1, 7, 13, 19, e.g., of the first memory (RLM1) in the same manner that field 1, frame 1 was obtained. In this manner, conversion from 1575 lines/24 frames per second to 525 lines/30 frames is readily and simply accomplished.

TABLE Ia

Recirculating Loop Memory No. 1 (RLM1)

[1575 line/24 frame Storage; 525 line/30 frame Readout]

| Frame 1 Line No. | Frame | Field | Line |
|---|---|---|---|
| 1 | 1 | 1 | 1 |
| 2 | | | |
| 3 | | | |
| 4 | 1 | 2 | 1 |
| 5 | | | |
| 6 | | | |
| 7 | 1 | 1 | 2 |
| 8 | | | |
| 9 | | | |
| 10 | 1 | 2 | 2 |
| 11 | | | |
| 12 | | | |
| 13 | 1 | 1 | 3 |
| 14 | | | |
| 15 | | | |
| 16 | 1 | 2 | 3 |
| 17 | | | |
| 18 | | | |
| 19 | 1 | 1 | 4 |
| 20 | | | |
| 21 | | | |
| 22 | 1 | 2 | 4 |
| 23 | | | |
| 24 | | | |
| 25 | 1 | 1 | 5 |
| ≈ | | | |
| 1567 | 1 | 1 | 262 |
| 68 | | | |
| 69 | | | |
| 70 | 1 | 2 | 262 |
| 71 | | | |
| 72 | | | |
| 73 | 1 | 1 | 263 |
| 74 | | | |
| 75 | | | |
| 76 | 1 | 2 | 263 |

TABLE Ib

Recirculating Loop Memory No. 2 (RLM2)

[1575 line/24 frame Storage; 525 line/30 frame Readout]

| Frame 2 Line No. | Frame | Field | Line | Frame | Field | Line |
|---|---|---|---|---|---|---|
| 1 | 2 | 1 | 1 | 3 | 1 | 1 |
| 2 | | | | | | |
| 3 | | | | | | |
| 4 | 2 | 2 | 1 | | | |
| 5 | | | | | | |
| 6 | | | | | | |
| 7 | 2 | 1 | 2 | 3 | 1 | 2 |
| 8 | | | | | | |
| 9 | | | | | | |
| 10 | 2 | 2 | 2 | | | |
| 11 | | | | | | |
| 12 | | | | | | |
| 13 | 2 | 1 | 3 | 3 | 1 | 3 |
| 14 | | | | | | |
| 15 | | | | | | |
| 16 | 2 | 2 | 3 | | | |
| 17 | | | | | | |
| 18 | | | | | | |
| 19 | 2 | 1 | 4 | 3 | 1 | 4 |
| 20 | | | | | | |
| 21 | | | | | | |
| 22 | 2 | 2 | 4 | | | |
| 23 | | | | | | |
| 24 | | | | | | |
| 25 | 2 | 1 | 5 | 3 | 1 | 5 |
| ≈ | | | | | | |
| 1567 | 2 | 1 | 262 | 3 | 1 | 262 |
| 68 | | | | | | |
| 69 | | | | | | |
| 70 | 2 | 2 | 262 | | | |
| 71 | | | | | | |
| 72 | | | | | | |
| 73 | 2 | 1 | 263 | 3 | 1 | 263 |
| 74 | | | | | | |
| 75 | | | | | | |
| 76 | 2 | 2 | 263 | | | |

In a similar manner, the 1575 lines/24 frames per second high-definition digital video information is converted to 625 lines/25 frames per second digital video information compatible with PAL standards by employing two recirculating loop memories like that shown in FIG. 3 and described above in connection with Tables 1*a* and 1*b*. Table 2 illustrates the lines which are read out to provide the conversion. It will be apparent that 625 lines are read out, and 950 lines are ignored. Conversion from 24 frames to 25 frames per second is accomplished by employing the second memory (RLM2) which introduces one additional stored field at the end of the 12th and 24th 24-frame, storage. Inasmuch as two fields constitute one frame, the addition of two fields in this manner provides the necessary 25 frames per second.

TABLE 2

Recirculating Loop Memory No. 1 (RLM1)

[1575 line/24 frame Storage; 625 line/25 frame Readout]

| Frame 1 Line No. | Frame | Field | Line |
|---|---|---|---|
| 1 | 1 | 1 | 1 |
| 2 | | | |
| 3 | 1 | 2 | 1 |
| 4 | | | |
| 5 | | | |
| 6 | 1 | 1 | 2 |
| 7 | | | |
| 8 | 1 | 2 | 2 |
| 9 | | | |
| 10 | | | |
| 11 | 1 | 1 | 3 |
| 12 | | | |
| 13 | 1 | 2 | 3 |
| 14 | | | |
| 15 | | | |
| 16 | 1 | 1 | 4 |
| 17 | | | |
| 18 | 1 | 2 | 4 |
| 19 | | | |
| 20 | | | |
| 21 | 1 | 1 | 5 |
| 22 | | | |
| 23 | 1 | 2 | 5 |
| 24 | | | |
| 25 | | | |
| ≈ | | | |
| 1556 | 1 | 1 | 312 |
| 57 | | | |
| 58 | 1 | 2 | 312 |
| 59 | | | |
| 60 | | | |
| 61 | 1 | 1 | 313 |
| 62 | | | |
| 63 | 1 | 2 | 313 |
| ≈ | | | |
| 1575 | | | |

The present embodiment of this invention is to be considered in all respects as illustrative and not restrictive.

What is claimed is:

1. A system for producing high-definition color motion pictures comprising camera means for separating a polychromatic image into a plurality of discrete color components and for providing respective analog video signals corresponding thereto, conversion means for receiving said analog signals from said camera means, said conversion means including sampling selectively for sampling the analog video signal for each respective color component and converting the same to digital signals representative of the respective analog color signals, digital recorder means for recording the digital signals for each color component from said conversion means and for recording digital frame identification data corresponding to frames of video information, and for recording timing signals, editing means for receiving the digital information recorded by said recorder means, said editing means being selectively operable to reproduce in electrical form signals representative of one or more frames of recorded pictorial information in selectable sequences, master recording means for recording in digital form the pictorial information in the sequences selected by said editing means, and means for reconverting the digital information recorded by said master recording means to respective analog color signals for enabling reproduction thereof for visual presentation, 2. A system as in claim 1 including a pictorial monitoring subsystem for receiving digital signals from said conversion means, said monitoring system including recirculating memory means for receiving said digital signals at one raster scan rate and providing output digital signals at a second raster scan rate, digital-to-analog conversion means for receiving the digital signals at said second scan rate and for converting the same to analog video color signals, and a color display device coupled with said digital-to-analog conversion means for receiving the analog color signals therefrom and providing a color display of the images received by said camera means.

3. A system as in claim 1 wherein said editing means includes effects generator means for changing in a predetermined manner digital signals recorded by said digital recorder means representative of frames of recorded pictorial information.

4. A system as in claim 1 wherein said means for reconverting the digital information includes recirculating memory means, said recirculating memory means having stored therein in digital form at least one frame of pictorial information according to a first aspect ratio, and means coupled with said recirculating memory means for selecting therefrom predetermined picture elements of a frame for providing output digital information representing a frame of pictorial information according to a second aspect ratio.

5. A system as in claim 1 wherein said editing means comprises incremental recorder means for receiving digital signals recorded by said digital recorder means and for selectively providing digital signals representative of desired frames of recorded pictorial information, and assembler means couple with said incremental recorder means, said assembler means being operable to selected from said incremental recorder means said signals representative of desired frames and providing the same to an output in selectable sequences.

6. A system as in claim 5 wherein said editing means comprises program control means coupled with said assembly means for controlling the operation thereof, said program control means selectably supplying to said assembler means program information selected by a film editor for controlling the compilation of frames of recorded pictorial information from said incremental recorder means.

7. A system as in claim 1 wherein said means for reconverting the digital information includes recirculating memory means for receiving said digital information recorded by said master recording means according to a first raster scan rate and for providing output digital information according to a second raster scan rate compatible with television standards, digital-to-analog conversion means coupled with said recirculating memory means for receiving the digital information therefrom and converting the same to analog video color signals, and television encoding means coupled with said digital-to-analog conversion means for receiving and encoding said analog video color signals, 8. A system as in claim 7 wherein said first scan rate is approximately 1575 lines/24 frames per second, and said second scan rate is approximately 525 lines/30 frames per second.

9. A system as in claim 7 wherein said first scan rate is approximately 1575 lines/24 frames per second, and said second scan rate is approximately 625 lines/25 frames per second.

10. A system as in claim 7 wherein said recirculating memory means comprises a pair of recirculating loop memories each having a capacity to store a frame of pictorial information according to a first high-definition scan rate, and means coupled with said recirculating memory means for selecting therefrom predetermined portions of each frame of information to enable conversion to a second raster scan rate.

11. A method of producing high definition color motion pictures comprising separating a polychromatic image into a plurality of discrete color components and generating respective analog video signals corresponding thereto, converting said analog signals to digital form whereby respective digital codes represent respective analog video signals, recording said digital codes in a first sequence, reordering the sequence of said recorded digital codes, and reconverting said reordered digital codes to analog form for enabling reproduction thereof for visual presentation.

12. A method as in claim 11 including changing said digital codes in a predetermined manner to create a special effect upon the ultimate visual presentation of the recorded digital codes.

13. A method as in claim 11 including storing at least a number of digital codes corresponding to a frame of pictorial information as a first number of pictorial lines, and reading out only a portion of said pictorial information by reading out only digital codes representing certain of said lines to convert frames of pictorial information from a first to a second standard.

14. A system for producing high-definition color motion pictures and enabling conversion from on scan rate to another scan rate, comprising camera means for picking up live a scene and separating a polychromatic image of the scene into a plurality of discrete color components and for providing respective analog video signals corresponding thereto, conversion means for receiving said analog signals from said camera means, said conversion means including sampling means for sampling the analog video signal for each respective color component and converting the same to digital signals representative of the respective analog color signals, digital recorder means for recording the digital signals for each color component from said conversion means and for recording digital frame identification data corresponding to frames of video information, recirculating memory means for receiving said digital information recorded by said digital recorder means as fields of information according to a first raster scan rate and for providing output digital information as fields according to a second raster scan rate compatible with a television standard, said recirculating memory means including recirculating loop memories for storing successive lines of each field of pictorial information in digital form according to said first scan rate and means to read out only certain lines of the information according to said second scan rate, and means coupled with said recirculating memory means for converting the digital information of said second scan rate therefrom to respective analog color signals for enabling reproduction thereof for visual presentation.

15. A system for producing high-definition color motion pictures and enabling an image aspect ratio change from a first to a second aspect ratio, comprising camera means for picking up live a scene and separating a polychromatic image of the scene into a plurality of discrete color components and for providing respective analog video signals corresponding thereto, conversion means for receiving said analog signals from said camera means, said conversion means including sampling means for sampling the analog video signal for each respective color component and converting the same to digital signals representative of the respective analog color signals, digital recorder means for recording the digital signals for each color component from said conversion means according to a first aspect ratio, recirculating memory means for enabling said video information recorded according to said first aspect ratio to be converted to digital information according to a second aspect ratio, said recirculating memory means having plural memories for storing therein in digital form plural lines comprising fields of pictorial information according to said first aspect ratio, and readout means coupled with said recirculating memory means for selecting therefrom predetermined picture elements of the respective lines of a field of pictorial information for providing output digital information representing a field of pictorial information according to said second aspect ratio, and means coupled with said recirculating memory means for converting for the digital information of said second aspect ratio therefrom to respective analog color signals for enabling reproduction thereof for visual presentation.

16. A system as in claim 15 wherein said second aspect ration is a 1.33 to 1 aspect ratio.

17. A system for producing high-definition color motion pictures and enabling the selective creation of special effects comprising camera means for picking up live a scene and deriving a polychromatic image, and for separating the polychromatic image into a plurality of discrete color components and for providing respective analog video signals corresponding thereto, conversion means for receiving said analog signals from said camera means, said conversion means including sampling means for sampling the analog video signal for each respective color component and converting the same to digital coded signals representative of the respective analog color signals, digital recording means for recording the digital signals for each color component from said conversion means for recording digital frame identification data corresponding to frames of video information, editing means for receiving the digital information recorded by said recording means, said editing means including effects generator means for changing in a predetermined manner the coding of at least certain of said digital signals recorded by said digital recording means representative of frames of recorded pictorial information for causing a predetermined change in the ultimate visual presentation thereof, digital recording means for recording in digital form the digital signals from said editing means and means for converting the digital information recorded by said last-named digital recording means to respective analog color signals for enabling reproduction thereof for visual presentation.

18. A system as in claim 17 wherein said conversion means samples a plurality of discrete instantaneous video amplitudes for each of said color signals from said camera means and transforms each sampled amplitude into digital coded information representative of the analog signal, and said effects generator means selectively changes certain of said digital coded information.

* * * * *

UNITED STATES PATENT OFFICE
CERTIFICATE OF CORRECTION

Patent No. 3,617,626 Dated November 2, 1971

Inventor(s) Joseph E. Bluth and Leo C. Hanseman

It is certified that error appears in the above-identified patent and that said Letters Patent are hereby corrected as shown below:

Column 12, line 50 should read -- means for sampling the analog video signal for each --; column 13, line 32 should read -- assembler means coupled with said incremental recorder --; line 33 should read -- means, said assembler means being operable to select --; column 14, line 27 should read -- pictures and enabling conversion from one scan rate to another --; column 15, line 14 should read -- converting the digital information of said second --; line 18 should read -- said second aspect ratio is a 1.33 to 1 aspect ratio --; column 16, line 4 should read -- each color component from said conversion means and for --.

Signed and sealed this 19th day of December 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334.